United States Patent
Jin et al.

(10) Patent No.: US 11,830,974 B2
(45) Date of Patent: Nov. 28, 2023

(54) BATTERY MODULE INCLUDING SENSING ASSEMBLY AND BUS BAR ASSEMBLY

(71) Applicant: LG Chem, Ltd., Seoul (KR)

(72) Inventors: Hee-Jun Jin, Daejeon (KR); Sung-Won Seo, Daejeon (KR); Yoon-Koo Lee, Daejeon (KR); Eun-Ah Ju, Daejeon (KR); Ho-June Chi, Daejeon (KR); Jeong-O Mun, Daejeon (KR)

(73) Assignee: LG Energy Solution, Ltd.

( * ) Notice: Subject to any disclaimer, the term of this patent is extended or adjusted under 35 U.S.C. 154(b) by 1021 days.

(21) Appl. No.: 16/621,322

(22) PCT Filed: Nov. 6, 2018

(86) PCT No.: PCT/KR2018/013395
§ 371 (c)(1),
(2) Date: Dec. 11, 2019

(87) PCT Pub. No.: WO2019/098588
PCT Pub. Date: May 23, 2019

(65) Prior Publication Data
US 2020/0203698 A1    Jun. 25, 2020

(30) Foreign Application Priority Data

Nov. 16, 2017 (KR) .......................... 10-2017-0152984

(51) Int. Cl.
*H01M 10/0525* (2010.01)
*H01M 10/42* (2006.01)
(Continued)

(52) U.S. Cl.
CPC ..... *H01M 10/0525* (2013.01); *H01M 10/425* (2013.01); *H01M 10/48* (2013.01);
(Continued)

(58) Field of Classification Search
CPC ............. H01M 50/502; H01M 10/425; H01M 10/482; H01M 2010/4271
See application file for complete search history.

(56) References Cited

U.S. PATENT DOCUMENTS

| 2013/0236761 A1 | 9/2013 | Seong et al. |
| 2016/0233477 A1 | 8/2016 | Merriman et al. |

(Continued)

FOREIGN PATENT DOCUMENTS

| CN | 102751542 A | 10/2012 |
| EP | 3182483 A1 | 6/2017 |

(Continued)

OTHER PUBLICATIONS

Extended European Search Report including Written Opinion for Application No. EP18879472.1, dated Oct. 5, 2020, pp. 1-9.

(Continued)

*Primary Examiner* — Daniel S Gatewood
(74) *Attorney, Agent, or Firm* — Lerner David LLP

(57) ABSTRACT

A battery module includes: a cell stack defined by a plurality of battery cells each including a positive electrode lead, a negative electrode lead, and at least one of a sensing negative electrode lead and a sensing positive electrode lead; a bus bar assembly including a plurality of connection bus bars electrically connected to one of the positive and negative electrode leads, a plurality of sensing bus bars electrically connected to the sensing negative electrode lead or the sensing positive electrode lead, and a plurality of bus bar frames including a connection accommodating portion for receiving one of connection bus bars and a sensing accommodating portion for receiving one of sensing bus bars; and a sensing assembly including a sensing frame that receives a circuit board electrically connected to the plurality of connection bus bars and the plurality of sensing bus bars.

16 Claims, 7 Drawing Sheets

(51) Int. Cl.
*H01M 10/48* (2006.01)
*H01M 50/50* (2021.01)
*H01M 50/519* (2021.01)
*H01M 50/507* (2021.01)
*H01M 50/211* (2021.01)
*H01M 50/569* (2021.01)

(52) U.S. Cl.
CPC ....... *H01M 10/482* (2013.01); *H01M 50/211* (2021.01); *H01M 50/50* (2021.01); *H01M 50/507* (2021.01); *H01M 50/519* (2021.01); *H01M 50/569* (2021.01); *H01M 2010/4271* (2013.01)

(56) References Cited

U.S. PATENT DOCUMENTS

| | | |
|---|---|---|
| 2016/0268652 A1 | 9/2016 | Eom et al. |
| 2017/0084963 A1 | 3/2017 | Park |
| 2017/0194674 A1 | 7/2017 | Lee et al. |
| 2017/0309872 A1 | 10/2017 | Kuboki et al. |
| 2017/0331097 A1 | 11/2017 | Lee et al. |
| 2019/0189979 A1 | 6/2019 | Choi et al. |

FOREIGN PATENT DOCUMENTS

| | | |
|---|---|---|
| JP | 2013187046 A | 9/2013 |
| JP | 2015115275 A | 6/2015 |
| JP | 2015125878 A | 7/2015 |
| JP | 2016081828 A | 5/2016 |
| JP | 2017084465 A | 5/2017 |
| JP | 2017115275 A | 6/2017 |
| KR | 20120055158 A | 5/2012 |
| KR | 20140083344 A | 7/2014 |
| KR | 20150062743 A | 6/2015 |
| KR | 20160077765 A | 7/2016 |
| KR | 20170011349 A | 2/2017 |
| KR | 20170034675 A | 3/2017 |
| KR | 20170039941 A | 4/2017 |
| KR | 20170094759 A | 8/2017 |
| WO | 2016129888 A1 | 8/2016 |
| WO | 2017138709 A1 | 8/2017 |

OTHER PUBLICATIONS

Search Report dated May 24, 2022 from the Office Action for Chinese Application No. 201880044845.7 dated Jun. 28, 2022, pp. 1-3.

International Search Report from PCT/KR2018/013395 dated Feb. 18, 2019, 3 pages.

BATTERY MODULE INCLUDING SENSING ASSEMBLY AND BUS BAR ASSEMBLY

CROSS-REFERENCE TO RELATED APPLICATIONS

This application is a national phase entry under 35 U.S.C. § 371 of International Application No. PCT/KR2018/013395 filed Nov. 6, 2018, which claims priority from Korean Patent Application No. 10-2017-0152984 filed on Nov. 16, 2017, the disclosures of which are incorporated herein by reference.

TECHNICAL FIELD

The present disclosure relates to a battery module including a sensing assembly and a bus bar assembly, and more particularly, to a battery module having improved productivity by facilitating electric connection of a plurality of battery cells to a bus bar assembly and a sensing assembly.

BACKGROUND ART

Currently commercialized secondary batteries include nickel cadmium batteries, nickel hydrogen batteries, nickel zinc batteries, lithium secondary batteries, etc., and the lithium secondary batteries thereamong are receiving attention due to advantages of free charging/discharging, a very low self-discharge rate, and high energy density, since a memory effect is barely generated compared to nickel-based secondary batteries.

Such a lithium secondary battery mainly uses a lithium-based oxide and a carbon material respectively as a positive electrode active material and a negative electrode active material. The lithium secondary battery includes an electrode assembly, in which a positive electrode plate and a negative electrode plate, on which the positive electrode active material and the negative electrode active material are respectively coated, are arranged with a separator therebetween, and an exterior material, i.e., a battery pouch exterior material, seals and accommodates the electrode assembly with an electrolyte solution.

Generally, the lithium secondary battery may be classified into a can-type secondary battery, in which the electrode assembly is embedded in a metal can, and a pouch-type secondary battery, in which the electrode assembly is embedded in a pouch of an aluminum laminate sheet, according to a shape of the exterior material.

Recently, the secondary battery has been widely used not only in small-sized apparatuses, such as a portable electronic device, but also in medium- and large-sized apparatuses, such as a vehicle or an energy storage apparatus. When the secondary battery is used in the medium- and large-sized apparatuses, a large number of secondary batteries are electrically connected to increase capacity and output. In particular, the pouch-type secondary battery is mostly used in such medium- and large-sized apparatuses due to easy stacking.

In order for the secondary batteries to be electrically connected inside a battery module, electrode leads may be connected to each other and a connected portion may be welded to maintain such a connected state. Moreover, the battery module may have parallel and/or series electric connection between the secondary batteries, and in this case, one end portion of the electrode lead may contact and be fixed to a bus bar for electric connection between the secondary batteries, via welding or the like.

At this time, the electric connection between the secondary batteries is often configured by bonding the electrode lead to the bus bar. In other words, in order to electrically connect the plurality of secondary batteries in parallel, the electrode leads of same polarity are connected and bonded to each other, and in order to electrically connect the plurality of secondary batteries in series, the electrode leads of different polarities are connected and bonded to each other.

In the related art, electrode leads provided at each of a plurality of battery cells are bent to be in contact with one surface of a bus bar, and then joined via welding. However, in such case, a plurality of manual operations by an operator are required to maintain a bent shape of the electrode leads, it is difficult to maintain an adhered state between the electrode leads and the bus bar due to elastic recovery of the electrode leads of a metal material, and moreover, weldability is low because it is difficult to maintain a state in which the plurality of electrode leads overlap at one point of the bus bar.

Meanwhile, a medium- or large-sized battery pack of the related art has a configuration in which a plurality of secondary batteries are accommodated in a pack case and electrically connected. In general, a voltage and a current of the secondary battery is detected and controlled by a circuit unit, such as a battery management system (BMS) or the like, by electrically contacting and connecting a bus bar to an electrode lead of the secondary battery. However, since a detecting device of such a type has a structure in which the bus bar is connected to the electrode lead of the secondary battery, a lot of wires are required to detect the voltage or the like, and accordingly, an assembling process of a battery module is completed and a possibility of defects is increased.

In this regard, a technology for solving such issues of the related art described above is required.

DISCLOSURE

Technical Problem

The present disclosure is designed to solve the problems of the related art, and therefore the present disclosure is directed to providing a battery module having improved productivity by facilitating electric connection of a plurality of battery cells to a bus bar assembly and a sensing assembly.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery module including: a cell stack formed as a plurality of battery cells stacked on each other including at least one of a sensing negative electrode lead and a sensing positive electrode lead together with a positive electrode lead and a negative electrode lead; a bus bar assembly including a plurality of connection bus bars electrically connected to one of the positive electrode lead and the negative electrode lead included in each of the plurality of battery cells, a plurality of sensing bus bars electrically connected to the sensing negative electrode lead or the sensing positive electrode lead included in each of the plurality of battery cells, and a plurality of bus bar frames including a connection accommodating portion where the plurality of connection bus bars are accommodated and a sensing accommodating portion where the plurality of sensing bus bars are accommodated; and a sensing assembly including a circuit board electrically connected to the plurality of connection bus bars and the plurality of sensing bus bars, and a sensing frame mounted on a front surface of the bus bar assembly and where a board embedding portion accommodating the circuit board therein is formed.

Also, the positive electrode lead may be provided at one end portion based on a center of one of the plurality of battery cells and the negative electrode lead may be provided at the other end portion based on the center of the one of the plurality of battery cells.

Moreover, the sensing negative electrode lead may be provided at the one end portion by a predetermined distance from the positive electrode lead.

Also, the sensing positive electrode lead may be provided at the other end portion by a predetermined distance from the negative electrode lead.

Furthermore, the connection accommodating portion and the sensing accommodating portion may be formed at one side surface of one of the plurality of bus bar frames.

Also, the connection accommodating portion may have a recessed structure such that one of the plurality of connection bus bars is accommodated and inserted therein.

Moreover, the sensing accommodating portion may have a recessed structure such that one of the plurality of sensing bus bars is accommodated and inserted therein.

Also, a partition wall may be provided between the connection accommodating portion and the sensing accommodating portion to partition the connection accommodating portion and the sensing accommodating portion.

Moreover, at least a portion of one side surface of the bus bar frame may be accommodated on a terrace portion of the battery cells.

Also, the plurality of bus bar frames may be arranged to be stacked on each other in a stack direction of the plurality of battery cells.

Moreover, a connection plate configured to electrically connect the plurality of connection bus bars to each other may be combined and fixed to a front surface of the plurality of connection bus bars.

Also, the sensing frame may include an insertion groove configured such that at least a portion of each of the connection bus bar and the sensing bus bar is inserted therein.

Moreover, the sensing assembly may further include a sensing terminal positioned in the insertion groove and having one end electrically connected to the circuit board and the other end electrically connected to the connection bus bar or the sensing bus bar.

Also, the sensing terminal may have a plate shape elongated from the circuit board in an inward direction.

Moreover, a curved portion modified to have elasticity may be formed at an end portion of the sensing terminal in an elongated direction.

Also, the sensing frame may include a connection protruding portion protruding inward to support the sensing terminal in a horizontal direction.

Moreover, the each of the plurality of bus bar frames may include an insertion portion such that the connection protruding portion is inserted backward.

Also, the connection accommodating portion may include a connection pressurizing portion pressurizing a rear side of each of the plurality of connection bus bars such that a front end portion of each of the plurality of connection bus bars protrudes outside the connection accommodating portion.

Moreover, the sensing accommodating portion may include a sensing pressurizing portion pressurizing a rear side of each of the plurality of sensing bus bars such that a front end portion of each of the plurality of sensing bus bars protrudes outside the sensing accommodating portion.

Also, the connection pressurizing portion may include a support elongated to have an inclination from a corner of the connection accommodating portion.

Moreover, an end portion of the support in an elongated direction may elastically pressurize the rear side of each of the plurality of connection bus bars.

Also, the sensing pressurizing portion may include a support elongated to have an inclination from a corner of the sensing accommodating portion.

Moreover, an end portion of the support in an elongated direction may elastically pressurize the rear side of each of the plurality of sensing bus bars.

Also, a stopper blocking both end portions of each of the plurality of connection bus bars in an up-and-down direction from moving forward may be formed at the connection accommodating portion.

Moreover, a stopper blocking both end portions of each of the plurality of sensing bus bars in the up-and-down direction from moving forward may be formed at the sensing accommodating portion.

Also, a bump preventing each of the plurality of connection bus bars from being displaced in a horizontal direction may be formed at the connection accommodating portion.

Moreover, a bump preventing each of the plurality of sensing bus bars from being displaced in the horizontal direction may be formed at the sensing accommodating portion.

In another aspect of the present disclosure, there is also provided a battery pack including at least one battery module.

In another aspect of the present disclosure, there is also provided a vehicle including the battery pack.

Advantageous Effects

According to an aspect of the present disclosure, in a battery module, unlike the related art, since an electrode lead does not need to be bent for electric connection with a bus bar, a bending process may be omitted, and since there is no spring back phenomenon caused by bending of the electrode lead, the electrode lead and the bus bar easily maintain a contact state, thereby preventing deterioration of weldability.

Moreover, according to such an aspect of the present disclosure, unlike the related art, the present disclosure may have a simplified manufacturing processes and reduced manufacturing costs because a bending process and bonding process via welding or the like are not required to be performed for contact connection between an electrode lead and a bus bar. In addition, since a bus bar assembly can be separated from a battery module without largely damaging the electrode lead when a defect occurs, a rework is facilitated and waste of a component due to damage may be reduced.

Also, according to an aspect of the present disclosure, by forming a connection accommodating portion and a sensing accommodating portion at the right side of a bus bar frame, a connection bus bar and a sensing bus bar can contact and be connected to an electrode lead and a sensing electrode lead simply by accommodating the bus bar frame in a terrace portion of a battery cell, and thus space utility of a battery module may be increased and manufacturing processes may be simplified.

Moreover, according to an aspect of the present disclosure, by achieving electrical connection of a circuit board to a connection bus bar or sensing bus bar by using a sensing terminal having a curved portion, electrical connection reliability of the circuit board to the connection bus bar or sensing bus bar is increased, and thus a percentage that are defective due to poor grounding may be reduced.

Also, according to an aspect of the present disclosure, structures of an insertion groove and connection protruding portion formed in a sensing frame, and an insertion portion of a bus bar frame, not only enable a sensing assembly to be easily mounted on a front surface of a bus bar assembly, but also enable electric connection of a circuit board to a connection bus bar and a sensing bus bar to be easily achieved, and thus manufacturing efficiency of the present disclosure may be increased.

Moreover, according to an aspect of the present disclosure, a connection pressurizing portion and a stopper formed at a connection accommodating portion, and a sensing pressurizing portion and a stopper formed at a sensing accommodating portion, not only facilitate the task of mounting a connection bus bar and a sensing bus bar on a bus bar frame, but also enable front end portions of the connection bus bar and sensing bus bar to protrude outside the connection accommodating portion and the sensing accommodating portion, such that the connection bus bar and the sensing bus bar are suitably inserted into a sensing frame. Accordingly, efficiency of an assembling process of a battery module may be increased, component damage that may occur during the assembling process may be decreased, and reliability of electric connection between a bus bar assembly and a sensing assembly may be increased.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

MODE FOR DISCLOSURE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustration only, not intended to limit the scope of the disclosure, so it should be understood that other equivalents and modifications could be made thereto without departing from the scope of the disclosure.

Figure 1:
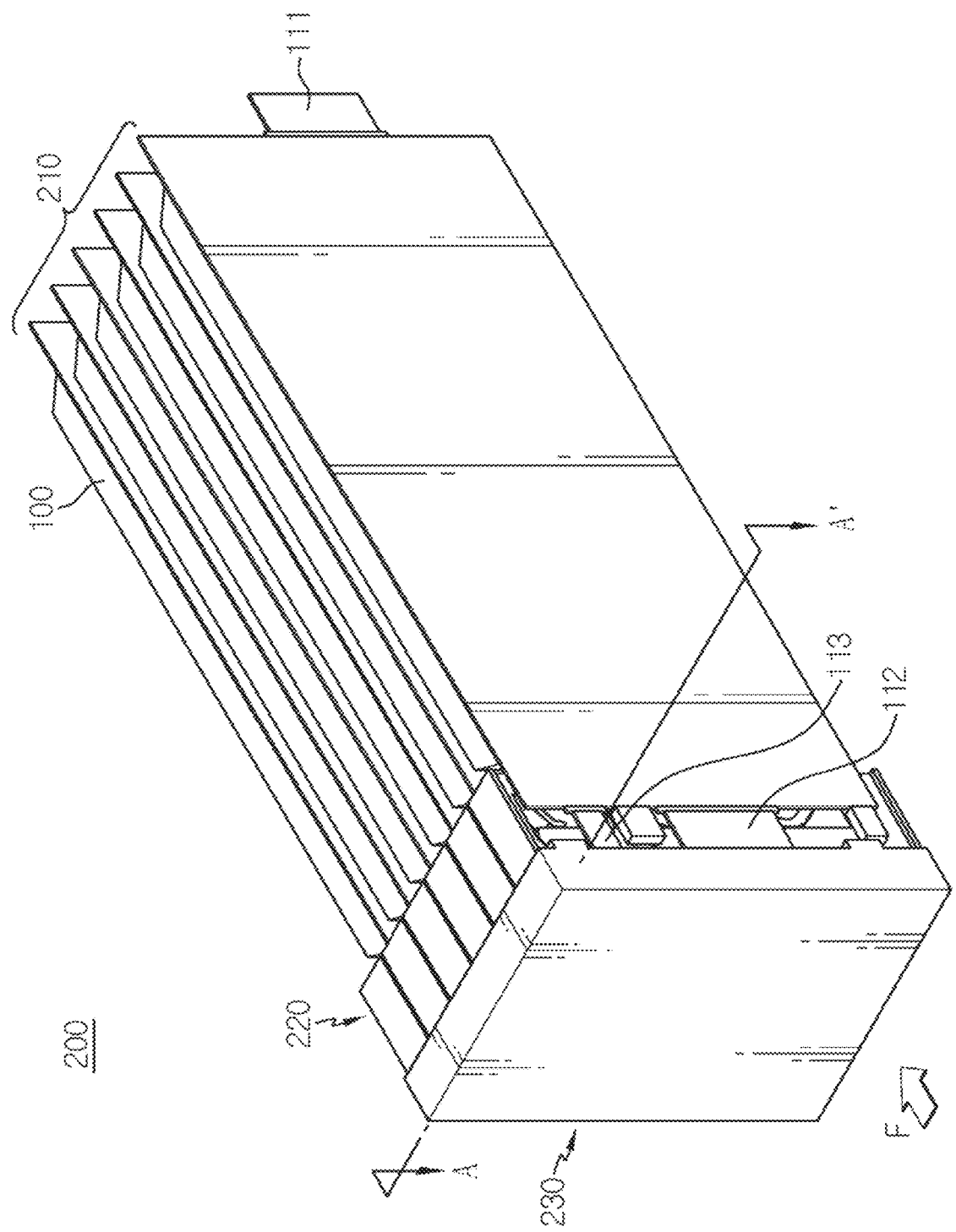
FIG. 1 is a perspective view schematically showing a battery module according to an embodiment of the present disclosure.

FIG. 1 is a perspective view schematically showing a battery module according to an embodiment of the present disclosure. Also, FIG. 2 is a side view schematically illustrating a battery cell that is a partial configuration with respect to a battery module, according to an embodiment of the present disclosure.

Figure 2:
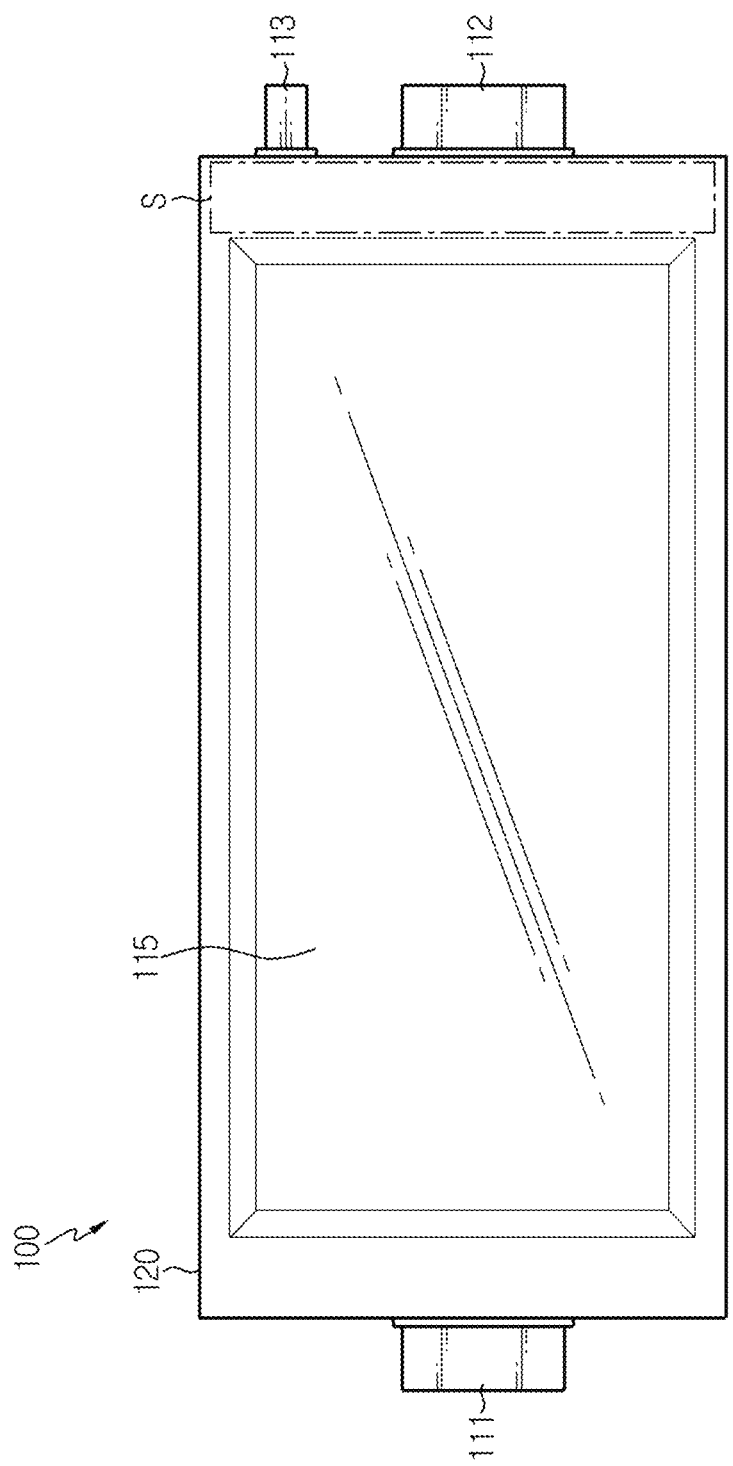
FIG. 2 is a side view schematically illustrating a battery cell that is a partial configuration with respect to a battery module, according to an embodiment of the present disclosure.

Referring to FIGS. 1 and 2, a battery module 200 according to an embodiment of the present disclosure may include a cell stack 210, a bus bar assembly 220, and a sensing assembly 230.

Here, the cell stack 210 may include a plurality of battery cells 100 stacked on each other.

Here, the battery cell 100 may be a pouch type battery cell 100. In particular, such a pouch type battery cell 100 may include an electrode assembly (not shown), an electrolyte solution (not shown), and a pouch 120.

Here, the pouch 120 may be configured of two pouches, i.e., a left pouch and a right pouch, which have an accommodating portion 115 of a concave shape. The electrode assembly and the electrolyte solution may be accommodated in the accommodating portion 115. Also, each pouch includes an external insulating layer, a metal layer, and an internal adhesive layer, and the inner adhesive layers may be adhered to each other at edge regions of the pouches 120 to form a sealing portion. Moreover, a terrace portion S may be formed on each of both end portions of the pouch 120, where a positive electrode lead 111 and a negative electrode lead 112 are formed.

Also, the electrode assembly is an assembly of an electrode and a separator, and may be configured in a shape in which one or more positive electrode plates and one or more negative electrode plates are arranged with the separator therebetween. Also, a positive electrode tab is provided at the positive electrode plate of the electrode assembly and one or more positive electrode tabs may be connected to the positive electrode lead 111.

Here, the positive electrode lead 111 has one end connected to the positive electrode tab and the other end exposed to the outside of the pouch 120, and such an exposed portion may function as an electrode terminal of the battery cell 100, for example, a positive electrode terminal of the battery cell 100.

Also, a negative electrode tab is provided at the negative electrode plate of the electrode assembly and one or more negative electrode tabs may be connected to the negative electrode lead 112. The negative electrode lead 112 has one end connected to the negative electrode tab and the other end exposed to the outside of the pouch 120 and such an exposed portion may function as an electrode terminal of the battery cell 100, for example, a negative electrode terminal of the battery cell 100.

Further, the positive electrode lead 111 and the negative electrode lead 112 may be provided on opposite directions based on the center of the battery cell 100. In other words, the positive electrode lead 111 may be provided at one end portion based on the center of the battery cell 100. Also, the negative electrode lead 112 may be provided on the other end portion based on the center of the battery cell 100. For example, as shown in FIGS. 1 and 2, each battery cell 100 may be configured such that the positive and negative electrode leads 111 and 112 protrude forward and backward.

As such, according to such a configuration of the present disclosure, there is no interference between the positive electrode lead 111 and the negative electrode lead 112 in one battery cell 100, and thus the area of an electrode lead may be increased.

Also, the positive and negative electrode leads 111 and 112 may be configured in a plate shape. In particular, the positive and negative electrode leads 111 and 112 may protrude in a horizontal direction while a wide area is erected to face the left and the right.

Also, the plurality of battery cells 100 may be included in the battery module 200 and stacked on each other in at least one direction. For example, as shown in FIGS. 1 and 2, the plurality of pouch type battery cells 100 may be stacked on each other in parallel in a left-and-right direction.

Here, each pouch type battery cell 100 may be arranged to be perpendicularly erected approximately on the ground such that, when viewed in a direction indicated by an arrow F (shown in FIG. 1), two wide areas are respectively positioned at the left and the right and a sealing portion is positioned at top, bottom, front, and back. In other words, each battery cell 100 may be erected in an up-and-down direction. Meanwhile, in the present specification, unless otherwise specified, up, down, front, back, left, and right directions are based on the direction indicated by the arrow F.

Meanwhile, the battery cell 100 applied to the present disclosure may further include a sensing electrode lead 113 for voltage sensing, in addition to the positive and negative electrode leads 111 and 112. The polarity of such a sensing electrode lead 113 may be positive when electrically connected to the positive electrode plate of the electrode assembly. Alternatively, the polarity of the sensing electrode lead 113 may be negative when electrically connected to the negative electrode plate of the electrode assembly. In other words, the battery cell 100 may include at least one of a sensing negative electrode lead (not shown) and the sensing positive electrode lead, together with the positive electrode lead 111 and the negative electrode lead 112.

In particular, the sensing positive electrode lead 113 may be positioned adjacent to the negative electrode lead 112, and the sensing negative electrode lead may be positioned adjacent to the positive electrode lead 111. In particular, the sensing negative electrode lead may be provided at one end portion by a predetermined distance from the positive electrode lead 111 and the sensing positive electrode lead 113 may be provided at the other end portion by the predetermined distance from the negative electrode lead 112.

For example, as shown in FIG. 2, the sensing positive electrode lead 113 may be positioned on a sealing portion positioned in a direction the negative electrode lead 112 protrudes. On the other hand, the sensing negative electrode lead may be spaced apart from the positive electrode lead 111 by the certain distance from the other end portion where the positive electrode lead 111 protrudes.

Moreover, the sensing positive electrode lead 113 may be electrically connected to a second negative electrode tab extending from the positive electrode plate separately from the positive electrode tab. Also, the sensing negative electrode lead may be electrically connected to a second negative electrode tab extending from the negative electrode plate separately from the negative electrode tab.

However, the battery module 200 according to the present disclosure is not limited to the pouch type battery cell 100 described above, and various battery cells 100 well-known at the time of application of the present disclosure may be employed.

Figure 3:
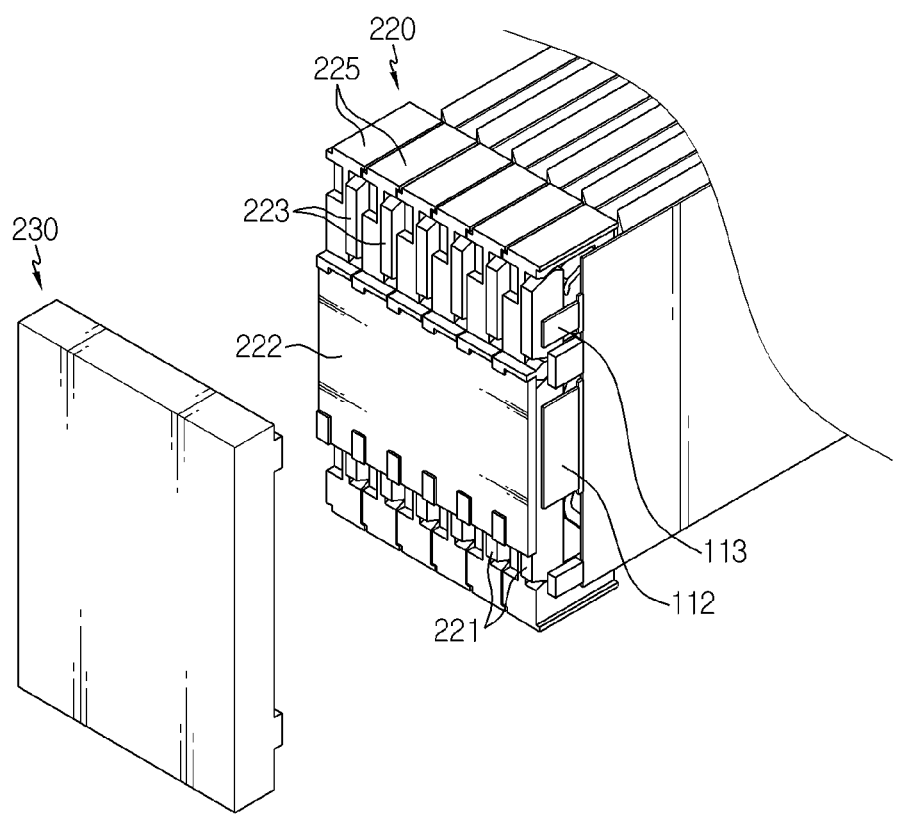
FIG. 3 is a partial perspective view schematically showing isolated components with respect to a battery module, according to an embodiment of the present disclosure.
Figure 4:
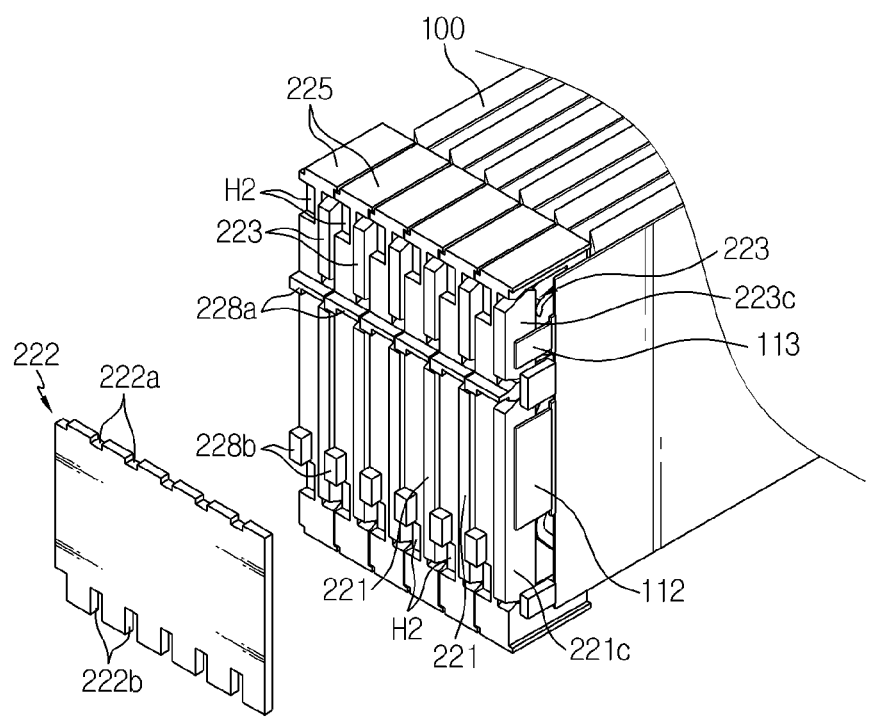
FIG. 4 is a partial perspective view schematically showing isolated components with respect to a battery module, according to an embodiment of the present disclosure.
Figure 5:
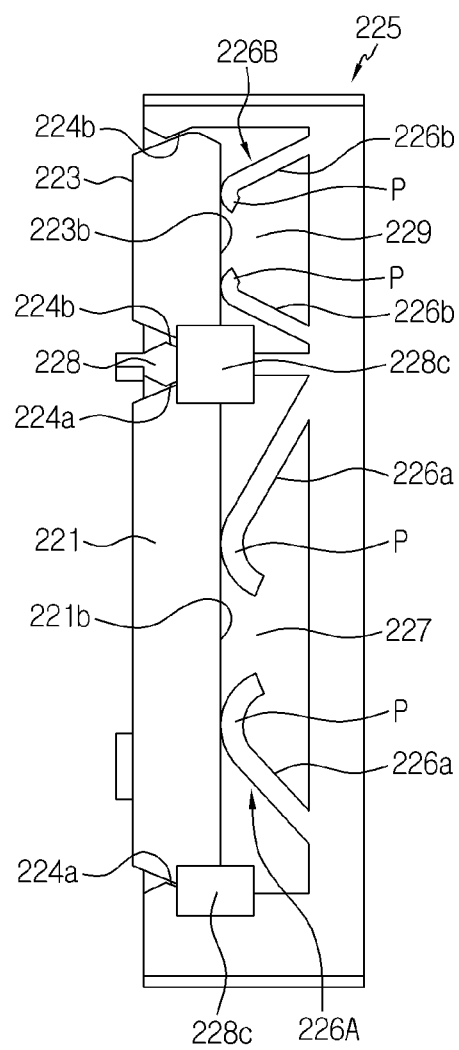
FIG. 5 is a side view schematically showing isolated components of a bus bar assembly with respect to a battery module, according to an embodiment of the present disclosure.

FIG. 3 is a partial perspective view schematically showing isolated components with respect to a battery module, according to an embodiment of the present disclosure. FIG. 4 is a partial perspective view schematically showing isolated components with respect to a battery module, according to an embodiment of the present disclosure. FIG. 5 is a side view schematically showing isolated components of a bus bar assembly with respect to a battery module, according to an embodiment of the present disclosure.

Referring to FIGS. 3 through 5, the bus bar assembly 220 may include a plurality of connection bus bars 221, a plurality of sensing bus bars 223, and a plurality of bus bar frames 225.

Here, the bus bar assembly 220 may be positioned at a front side or rear side of the cell stack 210 such as to be electrically connected to any one of the positive electrode lead 111 and the negative electrode lead 112 of the plurality of battery cells 100 of the cell stack 210.

Also, the battery module 200 may include a bus bar assembly (not shown) having a configuration different from the bus bar assembly 220. For example, as shown in FIG. 1, when the bus bar assembly 220 is provided at the front side of the cell stack 210, a bus bar assembly having a different configuration may be provided at the rear side of the cell stack 210. In other words, the bus bar assembly having the different configuration may include a plurality of bus bars (not shown) for electric connection of the positive electrode lead 111 of the cell stack 210. Moreover, the bus bar assembly having the different configuration may not include the sensing bus bar 223 unlike the bus bar assembly 220.

Here, the connection bus bar 221 may be configured to be electrically connected to any one of the positive electrode lead 111 and the negative electrode lead 112 provided in each of the plurality of battery cells 100. Here, the connection bus bar 221 may include at least one electric conductive material. For example, the electric conductive material may be a metal having high conductivity, such as copper, aluminum, nickel, gold, or an alloy thereof.

In particular, one side surface 221c of the connection bus bar 221 may be configured to contact another side surface of any one of the positive electrode lead 111 and the negative electrode lead 112 provided in the battery cell 100. Here, any one of the positive electrode lead 111 and the negative electrode lead 112 may contact the one side surface 221c of the connection bus bar 221 via a method such as laser welding or the like.

For example, as shown in FIG. 4, the battery module 200 of the present disclosure may include the six connection bus bars 221 mounted respectively on the six bus bar frames 225 and the six battery cells 100 electrically respectively connected to the six connection bus bars 221. Here, the other side surface of the negative electrode lead 112 of each of the six battery cells 100 may contact or be combined to the one side surface of each of the six connection bus bars 221.

As such, according to such a configuration of the present disclosure, unlike the related art, since the electrode lead does not need to be bent for electric connection with a bus bar, a bending process may be omitted, and since there is no spring back phenomenon caused by bending of the electrode lead, the electrode lead and the bus bar easily maintains a contact state, and thus deterioration of weldability may be prevented.

Also, the sensing bus bar 223 may be provided to be electrically connected to the sensing negative electrode lead or the sensing positive electrode lead 113 provided in each of the plurality of battery cells 100. The sensing bus bar 223 may include at least one electric conductive material. For example, the electric conductive material may be a metal having high conductivity, such as copper, aluminum, nickel, gold, or an alloy thereof.

In particular, one side surface 223c of the sensing bus bar 223 may be configured to contact the other side surface of any one of the sensing positive electrode lead 113 or the sensing negative electrode lead provided in the battery cell 100. Here, any one of the sensing positive electrode lead 113 and the sensing negative electrode lead may contact the one side surface 223c of the sensing bus bar 223 via a method such as laser welding or the like.

For example, as shown in FIG. 4, the battery module 200 of the present disclosure may include the six sensing bus bars 223 contacting the six sensing positive electrode leads 113 of the six battery cells 100. Here, the other side surface of the sensing positive electrode lead 113 of each of the six battery cells 100 may contact or be combined to the one side surface 223c of each of the six sensing bus bars 223.

As such, according to such a configuration of the present disclosure, unlike the related art, since the sensing positive electrode lead 113 does not need to be bent for electric connection with a bus bar, a bending process may be omitted, and since there is no spring back phenomenon caused by bending of the sensing positive electrode lead 113, the sensing positive electrode lead 113 and the bus bar easily maintains a contact state, and thus deterioration of weldability may be prevented.

Also, the bus bar frame 225 may include a connection accommodating portion 227 in which the connection bus bar 221 is accommodated. In particular, the connection accommodating portion 227 may have an accommodating space such that the connection bus bar 221 is accommodated and mounted on one side of the bus bar frame 225 in a left-and-right direction. Moreover, the connection accommodating portion 227 may include a partition wall 228 such that contact between the connection bus bar 221 and the sensing bus bar 223 is insulated.

Also, the bus bar frame 225 may include an electric insulating material. For example, the electric insulating material may be polyvinyl chloride plastic.

For example, as shown in FIG. 5, when viewed from the direction indicated by the arrow F of FIG. 1, the connection accommodating portion 227 in which the connection bus bar 221 is accommodated may be formed at one side portion of one bus bar frame 225 in the left-and-right direction. Here, the partition wall 228 may be formed at an upper portion of the connection accommodating portion 227.

Moreover, the bus bar frame 225 may include a sensing accommodating portion 229 where the sensing bus bar 223 is accommodated. In particular, the sensing accommodating portion 229 may have an accommodating space such that the sensing bus bar 223 is accommodated and mounted on the bus bar frame 225. Moreover, the sensing accommodating portion 229 may include the partition wall 228 for insulation with the connection bus bar 221.

For example, as shown in FIG. 5, the sensing accommodating portion 229 where the sensing bus bar 223 is accommodated may be formed at a side surface of one bus bar frame 225 in the left-and-right direction. Here, the partition wall 228 may be formed at a lower portion of the sensing accommodating portion 229 to prevent contact between the sensing bus bar 223 and the connection bus bar 221.

Also, the connection accommodating portion 227 and the sensing accommodating portion 229 may be provided at a right side of the bus bar frame 225. In particular, the connection accommodating portion 227 may be formed at a lower portion of the sensing accommodating portion 229. Moreover, the connection accommodating portion 227 may have a structure recessed in a left direction such that the connection bus bar 221 is accommodated and inserted therein. Also, a recessed depth of the connection accommodating portion 227 may be equal to or greater than a thickness of the connection bus bar 221 in the left-and-right direction.

Also, the sensing accommodating portion 229 may be formed at the left side of the bus bar frame 225. Moreover, the sensing accommodating portion 229 may be formed at an upper portion of the connection accommodating portion 227. Also, the sensing accommodating portion 229 may have a structure recessed such that the sensing bus bar 223 is accommodated and inserted therein. Moreover, a recessed depth of the sensing accommodating portion 229 may be equal to or greater than a thickness of the sensing bus bar 223 in the left-and-right direction.

As such, according to such a configuration of the present disclosure, by forming the connection accommodating portion 227 and the sensing accommodating portion 229 at the right side of the bus bar frame 225, the connection bus bar 221 and the sensing bus bar 223 contact and be connected to the electrode lead and the sensing electrode lead 113 by simply accommodating the bus bar frame 225 in the terrace portion S of the battery cell 100, and thus space utility of the battery module 200 may be increased and manufacturing processes may be simplified.

Also, in the bus bar frame 225 of the present disclosure, by forming the partition wall 228 defining the connection accommodating portion 227 and the sensing accommodating portion 229, short circuit between the connection bus bar 221 and the sensing bus bar 223 may be effectively prevented.

Referring to FIG. 4 together with FIG. 2, at least a portion of one side surface of the bus bar frame 225 may be accommodated on the terrace portion S of the battery cell 100. Here, the connection bus bar 221 may be connected to the positive electrode lead 111 or the negative electrode lead 112. Also, the sensing bus bar 223 may be connected to any one of the sensing negative electrode lead and the sensing positive electrode lead 113 having an opposite polarity from the electrode lead to which the connection bus bar 221 is connected.

For example, as shown in FIG. 4, as at least a portion of one side surface (right side surface) of the bus bar frame 225 is accommodated on the terrace portion S of FIG. 2 of the battery cell 100, one side surface (right side surface) of the connection bus bar 221 may contact the negative electrode lead 112 of the battery cell 100 and one side surface (right side surface) of the sensing bus bar 223 may contact the sensing positive electrode lead 113 of the battery cell 100.

Also, the plurality of bus bar frames 225 may be stacked on each other in a stack direction (left-and-right direction) of the plurality of battery cells 100. Here, the bus bar frame 225 may separately include a coupling member (not shown) such that the plurality of bus bar frames 225 are coupled and fixed to each other. For example, the coupling member may include a coupling bolt penetrating the plurality of bus bar frames 225.

Also, the bus bar frame 225 may have a coupling structure (not shown) such that the plurality of bus bar frames 225 are coupled and fixed to each other.

The coupling structure may include an insertion protrusion protruding in a left direction at the left side surface of the bus bar frame 225 and an accommodating groove where the insertion protrusion is accommodated at the right side surface of the bus bar frame 225. In other words, the coupling structure may be a female-male coupling structure.

Also, the bus bar assembly 220 may include a connection plate 222 configured such that the plurality of connection bus bars 221 are electrically connected to each other. In particular, the connection plate 222 may be combined and fixed to a front surface of the plurality of connection bus bars 221. In other words, the connection plate 222 may be combined to a front surface portion of each of the plurality of connection bus bars 221.

Also, a plurality of insertion groove 222*a* recessed in a downward direction may be formed at the top of the connection plate 222 at regular intervals. For example, the insertion groove 222*a* may have an uneven shape of a quadrangular structure.

Moreover, a combining protrusion 228*a* that is inserted into the insertion groove 222*a* formed at the top of the connection plate 222 may be formed on a front surface of the bus bar frame 225. Also, the combining protrusion 228*a* may have a rectangular parallelepiped shape such as to be inserted into the insertion groove 222*a* of the quadrangular structure. Moreover, the combining protrusion 228*a* may protrude in a downward direction.

Also, a plurality of insertion grooves 222*b* recessed in an upward direction may be formed at the bottom of the connection plate 222 at regular intervals. For example, the insertion groove 222*b* may have an uneven shape of a quadrangular structure.

Moreover, a combining protrusion 228*b* that is inserted into the insertion groove 222*b* formed at the bottom of the connection plate 222 may be formed on the front surface of the bus bar frame 225. Also, the combining protrusion 228*b* may have a rectangular parallelepiped shape such as to be inserted into the insertion groove 222*b* of the quadrangular structure.

For example, as shown in FIG. 4, the connection plate 222 may be formed to contact the front surface of the plurality of connection bus bars 221. Also, the six insertion grooves 222*a* recessed in a center direction may be formed at the top of the connection plate 222 and the six insertion grooves 222*b* recessed in the center direction may be formed at the bottom.

Also, for example, as shown in FIG. 4, in the bus bar frame 225, the six combining protrusions 228*a* that are insertable into the insertion groove 222*a* formed at the top of the connection plate 222 may be formed at the top of the connection bus bar 221. Moreover, in the bus bar frame 225, the six combining protrusions 228*b* that are insertable into the insertion groove 222*b* formed at the bottom of the connection plate 222 may be formed at the bottom of the connection bus bar 221.

As such, according to such a configuration of the present disclosure, the connection plate 222 may electrically connect the plurality of connection bus bars 221 by simply being mounted on the front surface of the bus bar frame 225, and thus manufacturing processes are simplified, thereby increasing manufacturing efficiency.

Also, a combining structure of the insertion groove 222*a* formed at the connection plate 222 and the combining protrusion 228*b* formed at the bus bar frame 225 enables the connection plate 222 to be stably mounted on the front surface of the bus bar frame 225, and thus the task of welding the connection plate 222 and the plurality of connection bus bars 221 may be facilitated.

Figure 6:
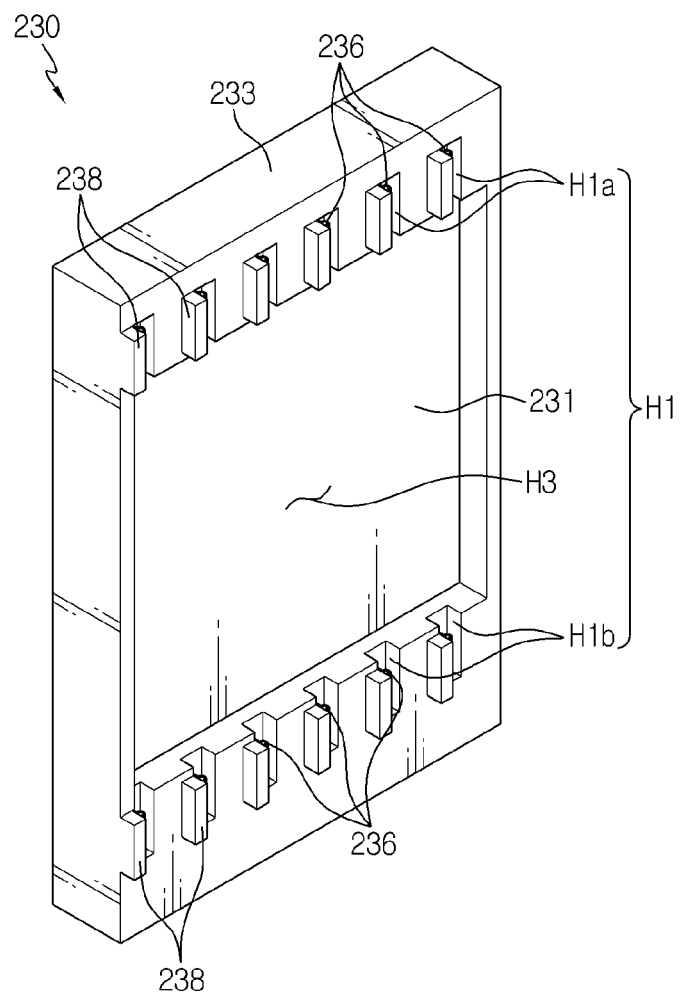
FIG. 6 is a perspective view schematically illustrating isolated components of a sensing assembly with respect to a battery module, according to an embodiment of the present disclosure.

FIG. 6 is a perspective view schematically illustrating isolated components of a sensing assembly with respect to a battery module, according to an embodiment of the present disclosure.

Referring to FIG. 6 together with FIG. 1, the sensing assembly 230 may include a circuit board 231 and a sensing frame 233.

Here, the circuit board 231 may be a board on which a circuit for transmitting a sensed current, voltage, temperature, or the like of the battery cell 100 to a battery management system (BMS) via a signal is printed. Accordingly, the circuit board 231 may transmit the sensed voltage of the battery cell 100 to an external component, such as the BMS, via a printed circuit and output pin. Alternatively, the circuit board 231 may include an internal circuit configured to protect the plurality of battery cells 100 from over-discharging, over-charging, over-heating, or the like. For example, the circuit board 231 may be embodied as a printed circuit board on which an internal circuit pattern is printed.

Moreover, the sensing frame 233 may be mounted on the front surface of the bus bar assembly 220 positioned at a front side of the cell stack 210. In addition, the sensing frame 233 may be positioned to face the front surface of the connection bus bar 221 and sensing bus bar 223 mounted on the bus bar frame 225.

Also, the sensing frame 233 may be mounted on a rear surface of the bus bar assembly 220 positioned at the rear side of the cell stack 210. Moreover, the sensing frame 233 may be positioned to face the rear surface of the connection bus bar 221 and sensing bus bar 223 mounted on the bus bar frame 225.

Also, the sensing frame 233 may include an electric insulating material. For example, the electric insulating material may be polyvinyl chloride plastic.

As such, according to such a configuration of the present disclosure, since the sensing frame 233 is positioned at the front surface of the bus bar assembly 220, an electric connection section of the connection bus bar 221 and the sensing bus bar 223 of the bus bar assembly 220 is reduced, thereby reducing the number or size of members for electric connection, and thus manufacturing costs may be reduced and the more compact battery module 200 may be manufactured.

Figure 7:
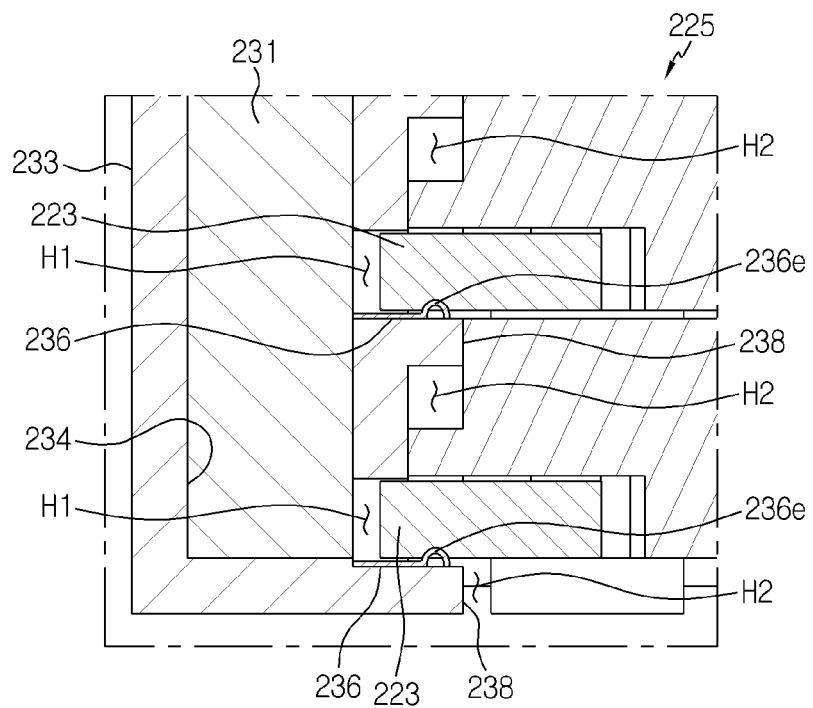
FIG. 7 is a partial cross-sectional view schematically showing a cross section of a battery module taken along a line A-A' of FIG. 1.

FIG. 7 is a partial cross-sectional view schematically showing a cross section of a battery module taken along a line A-A' of FIG. 1.

Referring to FIG. 7 together with FIG. 6, the sensing frame 233 may include a board embedding portion 234 accommodating the circuit board 231 therein. In particular, the board embedding portion 234 may have an internal space in the sensing frame 233 such that at least a portion of the circuit board 231 is inserted therein. For example, an insert injection method may be used as a method for inserting the circuit board 231 into the sensing frame 233.

For example, a method of manufacturing the sensing frame 233 into which the circuit board 231 is inserted may include: (a) mounting and fixing the prepared circuit board 231 inside a mold; and (b) injecting a melted insulating material into the mold to combine with at least a portion of the circuit board 231 and forming an outer shape of the sensing frame 233 by solidifying the melted material.

As such, according to such a configuration of the present disclosure, by inserting the circuit board 231 into the sensing frame 233, not only the circuit board 231 is stably fixed to the sensing frame 233 without having to use a separate adhesive member, but also the volume occupied by the circuit board 231 in a front-and-back direction is largely reduced, and thus ultimately, the size of the sensing assembly 230 may be reduced.

Moreover, an exposed portion H3 may be formed at the sensing frame 233 such that a portion of the circuit board 231 is exposed. For example, as shown in FIG. 6, an outer peripheral portion of the circuit board 231 may be inserted into the sensing frame 233, and the sensing frame 233 may have the exposed portion H3 in an opened shape such that a center portion of the circuit board 231 is externally exposed.

As such, according to such a configuration of the present disclosure, a job of replacing or recovering components or newly mounting a component in an exposed region of the circuit board 231 may be facilitated through the exposed portion H3.

Referring back to FIG. 7 together with FIG. 6, the sensing frame 233 may include an insertion groove H1 configured such that at least a portion of each of the connection bus bar 221 and sensing bus bar 223 is inserted.

In particular, the insertion grooves H1 recessed forward may be formed at the rear surface of the sensing frame 233 at regular intervals. Also, a plurality of insertion grooves H1a arranged in the left-and-right direction may be formed at the top of the rear surface of the sensing frame 233. Here, the insertion groove H1a formed at the top of the sensing frame 233 may be configured such that a portion of the sensing bus bar 223 of the bus bar assembly 220 is inserted. In particular, a portion of the top portion of the sensing bus bar 223 may be inserted into the insertion groove H1a.

Also, a plurality of insertion grooves H1b arranged in the left-and-right direction may be formed at the bottom of the rear surface of the sensing frame 233. Here, the insertion groove H1b formed at the bottom of the sensing frame 233 may be configured such that a portion of the connection bus bar 221 of the bus bar assembly 220 is inserted. In particular, a portion of the bottom portion of the connection bus bar 221 may be inserted into the insertion groove H1b.

Also, the sensing assembly 230 may further include a sensing terminal 236 for achieving electric connection of the circuit board 231 to the connection bus bar 221 and the sensing bus bar 223.

In particular, the sensing terminal 236 may be inserted into the insertion groove H1b of the sensing frame 233. In other words, as the sensing terminal 236 may be configured to contact one portion of the connection bus bar 221 inserted into the insertion groove H1b of the sensing frame 233 by being inserted into the insertion groove H1b.

Also, the sensing terminal 236 may have one end electrically connected to the circuit board 231 and the other end electrically connected to the connection bus bar 221. In other words, when the sensing terminal 236 is inserted into the insertion groove H1b formed at the bottom of the sensing frame 233, the other end of the sensing terminal 236 may contact and be connected to the connection bus bar 221.

In particular, the sensing terminal 236 may be inserted into the insertion groove H1a formed at the top of the rear surface of the sensing frame 233. In other words, the sensing terminal 236 may be configured to contact one portion of the sensing bus bar 223 inserted into the insertion groove H1a of the sensing frame 233 by being inserted into the insertion groove H1a.

Moreover, the sensing terminal 236 may have one end electrically connected to the circuit board 231 and the other end electrically connected to the sensing bus bar 223. For example, as shown in FIG. 7, when the sensing terminal 236 is inserted into the insertion groove H1a formed at the top of the sensing frame 233, the other end of the sensing terminal 236 may contact and be connected to the sensing bus bar 223.

Also, the sensing terminal 236 may include a plate shape elongated in an inward direction from the circuit board 231. In other words, the sensing terminal 236 may have a plate shape erected in the top-and-bottom direction and having a wide side surface in the left-and-right direction such as to surface-contact one side surface of the connection bus bar 221 or sensing bus bar 223 in the left-and-right direction.

Moreover, a curved portion 236e modified to have elasticity may be formed at an end portion of the sensing terminal 236 in an elongated direction. In particular, the curved portion 236e of the sensing terminal 236 may be elastically deformed by being adhered to the connection bus bar 221 or sensing bus bar 223 inserted into the insertion groove H1 of the sensing frame 233.

Obviously, the sensing terminal 236 inserted into the insertion groove H1b may also have the same shape as the sensing terminal 236 described above with reference to FIG. 7.

As such, according to such a configuration of the present disclosure, since the curved portion 236e of the sensing terminal 236 is elastically adhered to the connection bus bar 221 or sensing bus bar 223, electric connection reliability of the sensing terminal 236 to the connection bus bar 221 or sensing bus bar 223 may be increased.

Meanwhile, referring back to FIGS. 6 and 7, the sensing frame 233 may include a connection protruding portion 238 protruding inward to support the sensing terminal 236 in a horizontal direction. In other words, the connection protruding portion 238 may extend from an inner wall of the insertion groove H1 where the sensing terminal 236 is inserted.

In other words, the connection protruding portion 238 may be formed such that an inner side surface thereof is connected to an inner surface of the insertion groove H1. Accordingly, one end of the sensing terminal 236 is connected to the circuit board 231 and protrudes backward from the insertion groove H1 while the other end extending backward of the sensing terminal 236 may be supported by the connection protruding portion 238 in the horizontal direction (the left-and-right direction).

For example, as shown in FIG. 7, the sensing terminal 236 is inserted into the insertion groove H1 of the sensing frame 233, one end portion of the sensing terminal 236 is connected to the circuit board 231, and the other end portion of the sensing terminal 236 is extended to the one side surface (left side surface) of the connection protruding portion 238.

Moreover, the curved portion 236e is elastically deformed by the sensing bus bar 223 while the sensing bus bar 223 is inserted into the insertion groove H1, and thus the sensing terminal 236 may be adhered to one side surface (right side surface) of the sensing bus bar 223.

Also, although not separately illustrated, as in the sensing terminal 236 connected to the sensing bus bar 223, the curved portion 236e may be elastically deformed by the connection bus bar 221 while the connection bus bar 221 is inserted into the insertion groove H1, and thus the sensing terminal 236 may be adhered to one side surface (right side surface) of the connection bus bar 221.

An insertion portion H2 may be formed on the bus bar frame 225 such that the connection protruding portion 238 is inserted backward. In other words, as the connection protruding portion 238 is inserted into the insertion portion H2 formed in the bus bar frame 225, the sensing terminal 236 may be disposed between the connection bus bar 221 and the connection protruding portion 238 or between the sensing bus bar 223 and the connection protruding portion 238.

Referring back to FIG. 4, the insertion portion H2 may be formed on the other side surface (left side surface) that is opposite to the one side surface where the connection accommodating portion 227 is formed. Also, the insertion portion H2 may be formed on the other side surface (left side surface) that is opposite to the one side surface where the sensing accommodating portion 229 is formed. Also, the insertion portion H2 may be formed on each of the top and bottom of the front surface of the bus bar frame 225.

In other words, the insertion portion H2 may be formed on each of the top and bottom of the front surface of the bus bar frame 225, which is a position corresponding to the connection protruding portion 238 formed in the sensing frame 233.

Moreover, the insertion portion H2 formed in one bus bar frame 225 may face the connection accommodating portion 227 or the sensing accommodating portion 229 of the other adjacent bus bar frame 225. In other words, the connection protruding portion 238 facing the side surface of the connection bus bar 221 or sensing bus bar 223 of one bus bar frame 225 may be inserted into the insertion portion H2 formed in the other adjacent bus bar frame 225. For example, as shown in FIG. 4, the six insertion portions H2 may be formed on each of the top and bottom of the front surface of the bus bar frame 225.

As such, according to such a configuration of the present disclosure, by simply inserting one portion of the connection bus bar 221 and sensing bus bar 223 formed in the bus bar assembly 220 into the insertion groove H1 formed in the sensing frame 233 and inserting the connection protruding portion 238 formed in the sensing frame 233 into the insertion portion H2 of the bus bar frame 225, not only the sensing assembly 230 is mounted on the front surface of the bus bar assembly 220, but also electric connection of the circuit board 231 to the connection bus bar 221 and sensing bus bar 223 may be easily achieved.

Referring back to FIG. 5, the connection accommodating portion 227 may include a connection pressurizing portion 226A pressurizing a rear side 221b of the connection bus bar 221. Also, the connection pressurizing portion 226A may have a structure pressurizing the connection bus bar 221 such that a front end portion of the connection bus bar 221 protrudes outside the connection accommodating portion 227.

In particular, the connection pressurizing portion 226A may include a support 226a elongated in one direction. Moreover, the support 226a may be elongated forward to have an inclination from a corner of a rear side of the connection accommodating portion 227. In particular, the support 226a may be elongated towards the center of the connection bus bar 221 from each of both corners of the rear side of the connection accommodating portion 227.

An end portion of the support 226a in an elongated direction may elastically pressurize the rear side 221b of the connection bus bar 221. Also, the end portion of the support 226a in the elongated direction may have a structure P curved roundly backward. In other words, since the structure P curved roundly backward pressurizes the rear side 221b of the connection bus bar 221 with a smooth curved surface formed in a round curve, the support 226a smoothly pressurizes the connection bus bar 221 without damaging the connection bus bar 221.

Also, the sensing accommodating portion 229 may include a sensing pressurizing portion 226B pressurizing a rear side 223b of the sensing bus bar 223. Also, the sensing pressurizing portion 226B may have a structure pressurizing the sensing bus bar 223 such that a front end portion of the sensing bus bar 223 protrudes outside the sensing accommodating portion 229.

In particular, the sensing pressurizing portion 226B may include a support 226b elongated in one direction. Moreover, the support 226b may be elongated forward to have an inclination from a corner of a rear side of the sensing accommodating portion 229. In particular, the support 226b may be elongated towards a center portion of the sensing bus bar 223 in the up-and-down direction from each of both corners of the rear side of the sensing accommodating portion 229.

Also, an end portion of the support 226 in an elongated direction may elastically pressurize the rear side 223b of the sensing bus bar 223. Also, the end portion of the support 226b in the elongated direction may have the structure P curved roundly backward.

In other words, since the structure P curved roundly backward pressurizes the rear side 223b of the sensing bus bar 223 with a smooth curved surface formed in a round curve, the support 226b smoothly pressurizes the sensing bus bar 223 without damaging the sensing bus bar 223.

As such, according to such a configuration of the present disclosure, since the connection pressurizing portion 226A formed in the connection accommodating portion 227 and the sensing pressurizing portion 226B formed in the sensing accommodating portion 229 elastically absorb an impact occurred when the connection bus bar 221 and the sensing bus bar 223 are inserted into the insertion groove H1 of the sensing frame 233 of FIG. 6, damage to the sensing frame 233, the sensing terminal 236, the circuit board 231, or the like caused by bus bar insertion may be effectively prevented.

Referring back to FIG. 5, a stopper 224a blocking both end portions of the connection bus bar 221 in the up-and-down direction from moving forward may be formed in the connection accommodating portion 227. In other words, the connection pressurizing portion 226A may pressurize the rear side of the connection bus bar 221 while the stopper 224a blocking the connection bus bar 221 from protruding externally above a certain portion may be formed such that a front end portion of the connection bus bar 221 protrudes outside of the connection accommodating portion 227 at the connection accommodating portion 227.

For example, as shown in FIG. 5, the two supports 226*a* pressurizing the rear side of the connection bus bar 221 are formed at the connection accommodating portion 227 formed in the bus bar frame 225 and the two stoppers 224*a* are formed to block the both end portions of the connection bus bar 221 in the up-and-down direction from moving forward.

In other words, the connection bus bar 221 pressurizes and is inserted into the connection accommodating portion 227 while temporarily pushing the connection pressurizing portion 226A backward, and when the pressurization and insertion are completed, the connection pressurizing portion 226A pressurizes the rear side of the connection bus bar 221 in an outward direction, thereby positioning a front end of the connection bus bar 221 to protrude outside the connection accommodating portion 227 by a predetermined distance.

As such, according to such a configuration of the present disclosure, the connection pressuring portion 226A and the stopper 224*a* formed in the connection accommodating portion 227 not only facilitate a work of installing the connection bus bar 221 to the connection accommodating portion 227, but also position the front end portion of the connection bus bar 221 to protrude outside the connection accommodating portion 227 such that the connection bus bar 221 is suitably inserted into the insertion groove H1 of the sensing frame 233.

Accordingly, the present disclosure not only increases efficiency of an assembling process of the battery module 200 and reduces component damage occurred during the assembling process, but also increases reliability of electric connection between the bus bar assembly 220 and the sensing assembly 230.

Moreover, a stopper 224*b* blocking both end portions of the sensing bus bar 223 in the up-and-down direction from moving forward may be formed in the sensing accommodating portion 229. In other words, the sensing pressurizing portion 226B pressurizes the rear side 223*b* of the sensing bus bar 223 while the stopper 224*b* blocking the sensing bus bar 223 from protruding externally above a certain region may be formed such that a front end portion of the sensing bus bar 223 protrudes outside of the sensing accommodating portion 229 at the sensing accommodating portion 229.

For example, as shown in FIG. 5, the two supports 226*b* pressurizing the rear side 223*b* of the sensing bus bar 223 are formed at the sensing accommodating portion 229 formed in the bus bar frame 225 and the two stoppers 224*b* are formed to block the both end portions of the sensing bus bar 223 in the up-and-down direction from moving forward.

In other words, the sensing bus bar 223 pressurizes and is inserted into the sensing accommodating portion 229 while temporarily pushing the sensing pressurizing portion 226B backward, and when the pressurization and insertion are completed, the sensing pressurizing portion 226B pressurizes the rear side 223*b* of the sensing bus bar 223, thereby positioning a front end of the sensing bus bar 223 to protrude outside the sensing accommodating portion 229 by a predetermined distance.

As such, according to such a configuration of the present disclosure, the sensing pressuring portion 226B and the stopper 224*b* formed in the sensing accommodating portion 229 not only facilitate a work of installing the sensing bus bar 223 to the sensing accommodating portion 229, but also position the front end portion of the sensing bus bar 223 to protrude outside the sensing accommodating portion 229 such that the sensing bus bar 223 is suitably inserted into the insertion groove H1 of the sensing frame 233.

Accordingly, the present disclosure not only increases efficiency of an assembling process of the battery module 200 and reduces component damage occurred during the assembling process, but also increases reliability of electric connection between the bus bar assembly 220 and the sensing assembly 230.

Moreover, a bump 228*c* may be formed in the connection accommodating portion 227 to prevent the connection bus bar 221 from being displaced in the horizontal direction. In particular, the bump 228*c* may extend from the partition wall 228 defining the connection accommodating portion 227 and the sensing accommodating portion 229 to face the connection bus bar 221.

Also, the bump 228*c* may be formed in the sensing accommodating portion 229 to prevent the sensing bus bar 223 from being displaced in the horizontal direction. In particular, the bump 228*c* may extend from the partition wall 228 defining the connection accommodating portion 227 and the sensing accommodating portion 229 to face the sensing bus bar 223. Also, the bump 228*c* may be additionally formed at a bottom end portion of the bus bar frame 225 to face the bottom of the connection bus bar 221.

For example, as shown in FIG. 5, the two bumps 228*c* may be formed in the bus bar frame 225 to prevent the both end portions of the connection bus bar 221 in the up-and-down direction mounted in the connection accommodating portion 227 from being displaced in the horizontal direction. Also, among the two bumps 228*c*, the bump 228*c* formed at the partition wall 228 defining the connection accommodating portion 227 and the sensing accommodating portion 229 may face the bottom of the sensing bus bar 223 and the top of the connection bus bar 221, thereby preventing the sensing bus bar 223 and the connection bus bar 221 from being displaced in the horizontal direction.

The remaining bump 228*c* formed at the bottom of the bus bar frame 225 faces the bottom of the connection bus bar 221, thereby effectively preventing displacement of the connection bus bar 221.

A battery pack (not shown) according to an embodiment of the present disclosure may include at least one battery module 200.

In particular, the battery pack may include a configuration (a pack bus bar) accommodating at least one battery module in a pack case and electrically connecting the at least one battery module. Also, the battery pack may include a BMS or the like to detect a voltage or current of the battery module and control a battery.

Moreover, the present disclosure may provide a vehicle including the battery pack. In particular, the vehicle may include an accommodating portion (not shown) accommodating the battery pack therein.

Meanwhile, in the present specification, the terms indicating directions, such as up, down, left, right, front, and back, are used but it would be obvious to one of ordinary skill in the art that the terms are used only for convenience of description and may vary according to a position of a target object, a position of an observer, or the like.

While the present disclosure has been particularly shown and described with reference to exemplary embodiments thereof, it will be understood by those of ordinary skill in the art that various changes in form and details may be made therein without departing from the scope of the present disclosure as defined by the following claims.

| Reference Signs | |
|---|---|
| 200: battery module | 226A: connection pressurizing portion |
| 210: cell stack | 226B: sensing pressurizing portion |
| 100: battery cell | 226a, 226b: support |
| 111: positive electrode lead | 224a, 224b: stopper |
| 112: negative electrode lead | 228c: bump |
| 113: sensing electrode lead | 230: sensing assembly |
| 220: bus bar assembly | 233: sensing frame |
| 221: connection bus bar | 234: board embedding portion |
| 223: sensing bus bar | H1: insertion groove |
| 222: connection plate | 236: sensing terminal |
| 225: bus bar frame | 236e: curved portion |
| 227: connection accommodation portion | 238: connection protruding portion |

INDUSTRIAL APPLICABILITY

The present disclosure relates to a battery module including a bus bar assembly and a sensing bar assembly. Also, the present disclosure is applicable to industries related to a battery pack including a plurality of battery modules and an electric part, an electronic device including the battery pack, an energy storage system, or a vehicle.

What is claimed is:

1. A battery module comprising:
a cell stack defined by a plurality of battery cells stacked on each other, each of the battery cells including a positive electrode lead, a negative electrode lead, and at least one of a sensing negative electrode lead and a sensing positive electrode lead;
a bus bar assembly comprising a plurality of connection bus bars, a plurality of sensing bus bars, and a plurality of bus bar frames, each of the bus bar frames including a connection accommodating portion for receiving one of the connection bus bars and a sensing accommodating portion for receiving one of the sensing bus bars, each of the connection bus bars being electrically connected to one of the positive electrode lead and the negative electrode lead of a respective one of the plurality of battery cells, and each of the plurality of sensing bus bars being electrically connected to the sensing negative electrode lead or the sensing positive electrode lead of a respective one of the plurality of battery cells; and
a sensing assembly comprising a circuit board and a sensing frame mounted on a front surface of the bus bar assembly and receiving the circuit board therein in a board embedding portion, the circuit board being electrically connected to the plurality of connection bus bars and the plurality of sensing bus bars of the bus bar assembly.

2. The battery module of claim 1, wherein each of the positive electrode leads is provided at one end portion of a respective one of the plurality of battery cells, and each of the negative electrode leads is provided at the other end portion of the respective one of the plurality of battery cells, and
wherein each of the sensing negative electrode leads is provided at the one end portion of a respective one of the plurality of battery cells at a predetermined distance from the respective positive electrode lead, and each of the sensing positive electrode leads is provided at the other end portion of the respective one of the plurality of battery cells at a predetermined distance from the respective negative electrode lead.

3. The battery module of claim 2, wherein the connection accommodating portion and the sensing accommodating portion of each of the bus bar frames are formed at one side surface of a respective one of the plurality of bus bar frames,
the connection accommodating portions each having a recessed structure such that one of the plurality of connection bus bars is received therein, and the sensing accommodating portions each having a recessed structure such that one of the plurality of sensing bus bars is received therein, and
wherein a partition wall is provided between the connection accommodating portion and the sensing accommodating portion of each of the bus bar frames to partition the respective connection accommodating portion from the respective sensing accommodating portion.

4. The battery module of claim 3, wherein at least a portion of the one side surface of each of the bus bar frames is accommodated on a terrace portion of a respective one of the battery cells.

5. The battery module of claim 4, wherein the plurality of bus bar frames are stacked on each other in a stack direction of the plurality of battery cells, and
a connection plate configured to electrically connect the plurality of connection bus bars to each other is fixed to a front surface of each of the plurality of connection bus bars.

6. The battery module of claim 1, wherein the sensing frame comprises a plurality of insertion grooves configured such that at least a portion of each of the connection bus bars and the sensing bus bars are received within a respective one of the insertion grooves.

7. The battery module of claim 6, wherein the sensing assembly further comprises a plurality of sensing terminals positioned in the respective insertion grooves, each sensing terminal having one end electrically connected to the circuit board and the other end electrically connected to one of the connection bus bars or the sensing bus bars.

8. The battery module of claim 7, wherein each of the sensing terminals has a shape of an elongated plate extending in an inward direction from the circuit board, and
each of the sensing terminals has an elastically deformable curved portion at an end portion of the respective sensing terminal in the inward direction.

9. The battery module of claim 7, wherein the sensing frame comprises a plurality of connection protruding portions protruding in the inward direction for supporting the sensing terminal in a horizontal direction, and
wherein each of the plurality of bus bar frames comprises an insertion portion configured to receive a respective one of the connection protruding portions.

10. The battery module of claim 1, wherein the connection accommodating portion of each of the bus bar frames comprises a connection pressurizing portion pressurizing a rear side of a respective one of the plurality of connection bus bars such that a front end portion of the respective connection bus bar protrudes outside the connection accommodating portion, and
wherein the sensing accommodating portion of each of the bus bar frames comprises a sensing pressurizing portion pressurizing a rear side of a respective one of the plurality of sensing bus bars such that a front end portion of the respective sensing bus bar protrudes outside the sensing accommodating portion.

11. The battery module of claim 10, wherein the connection pressurizing portion of each of the bus bar frames comprises a connection support elongated at an oblique angle from a corner of the respective connection accommodating portion, an end portion of the connection support in an elongated direction elastically pressurizing the rear side of the respective connection bus bar, and wherein the sensing pressurizing portion of each of the bus bar frames comprises a sensing support elongated at an oblique angle from a corner of the respective sensing accommodating portion, an end portion of the sensing support in an elongated direction elastically pressurizing the rear side of the respective sensing bus bar.

12. The battery module of claim 10, further comprising a stopper at the connection accommodating portion of each of the bus bar frames for blocking a respective one of the connection bus bars from moving forward, and a stopper at the sensing accommodating portion of each of the bus bar frames for blocking a respective one of the sensing bus bars from moving forward.

13. The battery module of claim 10, further comprising a bump at the connection accommodating portion of each of the bus bar frames for preventing a respective one of the connection bus bars from being displaced in a horizontal direction, and a bump at the sensing accommodating portion of each of the bus bar frames for preventing a respective one of the sensing bus bars from being displaced in the horizontal direction.

14. A battery pack comprising at least one battery module according to claim 1.

15. A vehicle comprising the battery pack according to claim 14.

16. The battery module of claim 1, wherein the plurality of bus bar frames includes a respective bus bar frame for each of the battery cells in the cell stack.

* * * * *